(No Model.)

J. S. SPEER.
CAR AXLE BOX.

No. 491,819. Patented Feb. 14, 1893.

Witnesses:
O. W. Parker
J. S. Barker

Inventor
Jacob S. Speer
per Charles William B. King
Attys.

UNITED STATES PATENT OFFICE.

JACOB S. SPEER, OF SPRINGFIELD, MISSOURI.

CAR-AXLE BOX.

SPECIFICATION forming part of Letters Patent No. 491,819, dated February 14, 1893.

Application filed October 5, 1892. Serial No. 447,909. (No model.)

*To all whom it may concern:*

Be it known that I, JACOB S. SPEER, a citizen of the United States, residing at Springfield, in the county of Greene and State of Missouri, have invented certain new and useful Improvements in Car-Axle Boxes; and I do hereby declare the following to be a full, clear, and exact description of the invention, such as will enable others skilled in the art to which it appertains to make and use the same.

My invention relates to car axle boxes and it consists of a false back or removable back plate for the axle box, and means for holding it in place substantially as will be hereinafter described.

Figure 1:
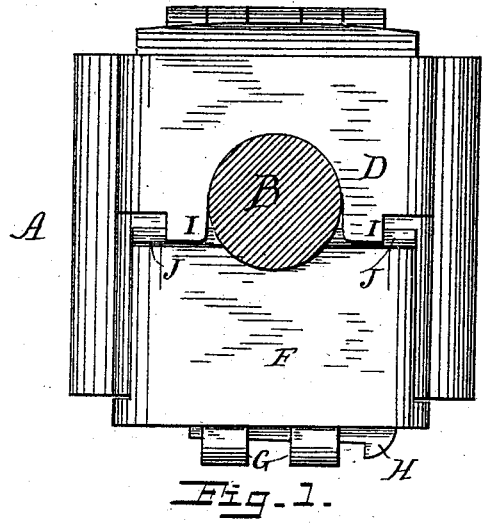
Figure 2:
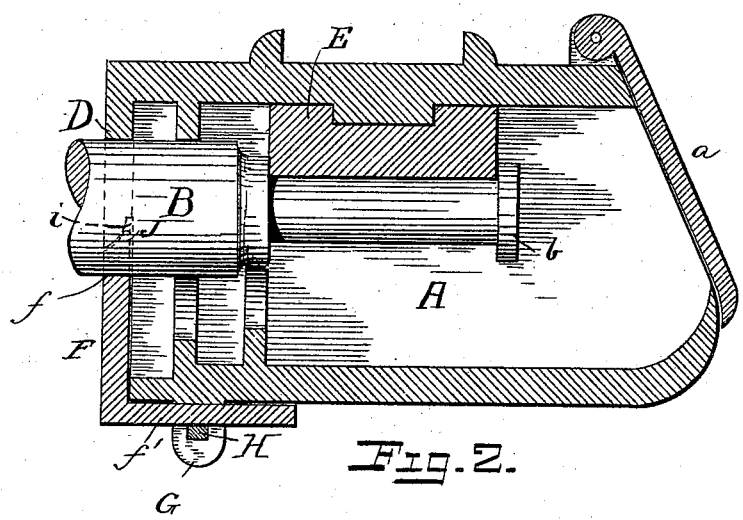
Figure 3:
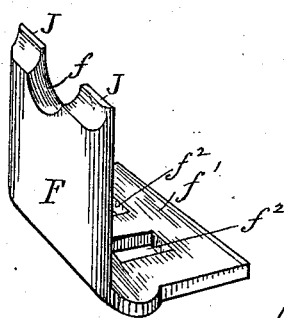

Figure 1 is a rear view of a car axle box provided with my invention, the axle being shown in section. Fig. 2 is a vertical longitudinal section through the box. Fig. 3 is a perspective view, detached, of the false back or removable back plate.

In the construction of car axle boxes it is necessary that the opening in the rear end or face thereof through which the axle or journal extends should be larger than the axle, in order that the head on the end thereof may be passed into the box, and also so that the removable brasses or bearings for the axle may be put in place. It is customary to close this end, so that the oil shall not escape from the box, by means of wooden or leather backing pieces, or false backs as they are called. These however are objectionable from the fact that they get hot and burn up. In order to overcome this objection I have devised a false back or removable back plate of metal which has certain novel features which I will now describe.

In the drawings, A represents the car axle box which may be of the form and construction now ordinarily employed. It is provided at its front end with a cap or cover $a$ through which the oil, &c. are introduced into the box.

B represents the car axle provided at its extreme end with a head $b$.

C represents a part of the framework of the car truck by which the car axle box is secured thereto.

The rear plate D of the car axle box is provided with the usual opening through which is inserted the plate E carrying the bearings or brasses against which the axle bears.

F designates the false back or removable plate which is put in place against the back plate of the axle box after the parts are in proper position. It has in its upper edge a curve $f$ which is adapted to fit closely against the under side of the axle B,—and on either side of the said curved portion are two lugs, J, J, adapted to enter the undercut recesses $i$ in the back plate of the car axle box, upon either side of the journal B. The upper part of the rear plate D is thicker than is usual in car axle boxes as they are now constructed to permit of these undercut recesses $i$ being made. The back is formed with two bearing pieces, I, I, which overlie the recesses $i$, and the tapering lugs J on the false back, when the latter is in place, and thus give a firm support to the upper end of the false or removable back F. The removable back F is provided with an angular flange or plate $f'$ which is adapted to lie against the lower face of the bottom of the car axle box. This plate or flange is perforated at $f^2$ and through these perforations extend two lugs, G, G, which are secured to the bottom of the car axle box. These lugs are perforated and through them are passed keys H which may be of spring metal or not as preferred, which keys serve to hold the false back or removable plate in position. By making the lugs J and the recesses into which they extend tapering, I can secure a very tight fit of the false back against the rear face of the axle box so that very little, if any, oil will leak out after it has been secured in position by the keys H.

Having thus described my invention, what I claim and desire to secure by Letters Patent is:—

1. A car axle box the rear plate of which is provided with the recesses $i$ on either side of the opening through which the axle enters the box, in combination with a false or removable back having lugs which enter the said recesses, and means for securing the said back or removable plate to the axle box, substantially as set forth.

2. In combination with a car axle box having the rear plate thereof provided with the recesses *i* and the overhanging lugs I, in combination with the false or removable back F provided with the lugs J situated on either side of the curved bearing which rests against the under side of the axle, the perforated flange or plate *f* adapted to fit over lugs on the bottom of the car axle box, and the keys which hold the false back or removable plate in place, substantially as set forth.

In testimony whereof I affix my signature in presence of two witnesses.

JACOB S. SPEER.

Witnesses:
O. F. CASTEEN,
J. F. CORRIGAN.